United States Patent [19]

Andren et al.

[11] Patent Number: 4,707,839
[45] Date of Patent: Nov. 17, 1987

[54] SPREAD SPECTRUM CORRELATOR FOR RECOVERING CCSK DATA FROM A PN SPREAD MSK WAVEFORM

[75] Inventors: Carl F. Andren, Indialantic; David A. Olaker, Palm Bay, both of Fla.

[73] Assignee: Harris Corporation, Melbourne, Fla.

[21] Appl. No.: 535,923

[22] Filed: Sep. 26, 1983

[51] Int. Cl.⁴ .............................................. H04K 1/02
[52] U.S. Cl. ............................... 375/1; 375/96; 380/42; 380/46; 380/47; 364/824
[58] Field of Search ............... 178/22.01, 22.05, 22.06, 178/22.13, 22.14, 22.16, 22.19; 364/728, 819, 824; 371/2, 37, 43; 375/1, 2.1, 90, 96, 47; 380/34, 42, 43, 46, 47

[56] References Cited

U.S. PATENT DOCUMENTS

| | | | |
|---|---|---|---|
| 3,291,908 | 12/1966 | Ehrat | 178/22.13 |
| 4,225,935 | 9/1980 | Zscheile, Jr. et al. | 375/1 |
| 4,295,204 | 10/1981 | Sunstein | 364/824 |
| 4,320,513 | 3/1982 | Lampert | 375/1 |
| 4,465,153 | 8/1984 | van de Pas | 178/22.16 |

*Primary Examiner*—Benedict V. Safourek
*Attorney, Agent, or Firm*—Antonelli, Terry & Wands

[57] ABSTRACT

In a spread spectrum communications system employing cyclic code shift keying as its primary modulation, the transmission waveform is spread for transmission security by modulo-2 adding a pseudo-noise sequence to the CCSK data symbols prior to phase modulating onto a carrier signal for transmission. If the transmission modulation is minimum shift keying (MSK) the two components of the data stream are applied to the carrier with a differential encoding step implicit in the modulation scheme. This differential encoding characteristic makes stripping of the PN spread function prior to CCSK demodulation difficult at the receiving end. In order to demodulate this waveform in an optimum manner, an array correlator, the adjacent correlator stages of which have one chip relative time displacements of their CCSK reference waveform, is employed. In effect the array correlator becomes a parallel array of matched filters matched to each cyclic shift of the incoming waveform. By modulo-2 addition of the PN spreading waveform with the time displaced CCSK reference waveform in each stage of the correlator, the correlator can be made to match all versions of the spread symbol being received.

23 Claims, 6 Drawing Figures

SPREAD SPECTRUM CORRELATOR FOR RECOVERING CCSK DATA FROM A PN SPREAD MSK WAVEFORM

The present invention was made with Government support under Contract No. N62269-79-C-0013 awarded by the Department of the Navy. The Government has certain rights in this invention.

FIELD OF THE INVENTION

The present invention relates, in general, to spread spectrum radio communication systems, and is particularly directed to an improved correlation technique for recovering cyclic code shift keying (CCSK) data from a pseudo-noise (PN) spread minimum shift keying (MSK) waveform.

BACKGROUND OF THE INVENTION

In the field of radio communications employing spread spectrum modulation, which includes hybrid frequency hop with phase modulation, transmission is accomplished using symbols which are demodulated as coherent wholes, each frequency hop using a matched filtering scheme. Since coherence cannot be maintained between frequency hops, it is necessary to use a modulation technique which achieves the greatest processing efficiency for each symbol. One such modulation technique is called cyclic code shift keying (CCSK). This modulation technique employs a binary bit sequence, having low autocorrelation sidelobe properties, which is cyclicly shifted a number of times proportional to the data word being transmitted. For example, a 32 bit word may be cyclicly shifted from 0 to $2^5$ times to encode a 5 bit word. This CCSK symbol is then modulo-2 added to a PN spreading function having the same or integrally related, higher bit rate to provide transmission security. Finally, the spread symbol is minimum shift keyed (MSK) modulated onto a carrier for transmission.

The MSK process can be considered to be either a QPSK process with sinusoidally shaped base-band signals or QPSK with linear phase transitions which are either +90° or −90°, or an FSK process with a frequency deviation equal to exactly $\pm \frac{1}{4}$ of the bit rate. In the FSK process one system waveform is defined as having the upper frequency when there exists no change on a bit boundary and having the lower frequency when a transition occurs on a bit boundary.

With the CCSK symbol mixed with a PN spreading function, the net effect is that, when the PN signal has a data transition, the MSK waveform has a +90° phase transition when it would have been −90°, or vise versa. Thus, every time the PN waveform has a transition, the net effect is a 180° phase reversal of the remainder of the symbol effected by changing the sign of the next 90° phase shift.

In the demodulator for a CCSK waveform, the straightforward method for demodulation of a spread spectrum encrypted waveform is to first strip the PN spreading function off and then demodulate the CCSK data symbol. Noting the FSK definition of the MSK waveform, it can be seen that when the PN sequence makes a transition, the spectral components are inverted for one clock cycle. One method for stripping away the PN sequence might therefore be to provide a means for spectrum inversion at each PN transition. Unfortunately, such an operation is extremely difficult or substantially impossible to perform with phase continuity, which is essential to avoid decorrelating the remainder of the symbol.

A second method for stripping away the PN sequence would be to phase modulate the incoming signal with the PN waveform processed to provide a smooth 180° phase variation over the duration of one clock cycle for each PN transition. A problem arises however, in that this phase variation must be sometimes positive and sometimes negative depending on whether or not a CCSK symbol transition occurred. To examine this further, if for example the incoming signal makes a phase variation of +90° and stripping away the PN sequence would have made that −90° then a phase variation of −180° should be added in to effect the change. If on the other hand the reverse situation occurred, the required phase variation would be +180°. If the wrong phase correction is applied, a 270° phase rotation will occur which, while it ends up at the right place, will not correlate correctly with the CCSK reference. Thus, it can be seen that any attempt to provide PN stripping prior to the correlator causes significant decorrelation of the CCSK symbol on approximately 50% of the PN transitions.

SUMMARY OF THE INVENTION

In accordance with the present invention, the signal recovery problem created by the differential encoding characteristic of a CCSK waveform or other similar waveforms (such as a PPM modulation signal), which effectively prevents stripping of the PN spreading function prior to CCSK demodulation at the receiver, is circumvented by a new and improved correlation scheme through which stripping of the overlying spreading function and demodulation of a CCSK or PPM pseudo-noise symbols are performed simultaneously. Pursuant to a basic embodiment of the invention use is made of a hybrid array correlator, such as that described in copending patent application Ser. No. 202,649, filed Oct. 31, 1980 by W. R. Frazier, Jr. entitled "Programmable Time Invariant Coherent Spread Symbol Correlator", and assigned to the Assignee of the present application, which effectively operates as a parallel array of matched filters, matched to each cyclic shift of the incoming waveform. By modulo-2 addition of the PN spreading waveform with a time-displaced reference waveform (e.g. CCSK, PPM) in each stage of the correlator, the correlator can be made to match all versions of the spread symbol being received.

In addition to the use of an array correlator, the correlation scheme of the present invention may be applied to transversal correlator and digital convolver configurations. In the transversal correlator a static reference sequence is initially loaded through a serial shift register and parallel-transferred into a sequence of static registers. The transversal correlator provides multiple delayed versions of the signal samples and multiplies these respective delayed versions by a corresponding reference sample and sums the products over all stages.

The digital convolver also employs a static reference sequence which is serial-to-parallel loaded into a set of static registers, the contents of which are then correlated with undelayed signal samples and the correlation results are sequentially summed over all samples of the signal sequence.

DETAILED DESCRIPTION

Figure 1:
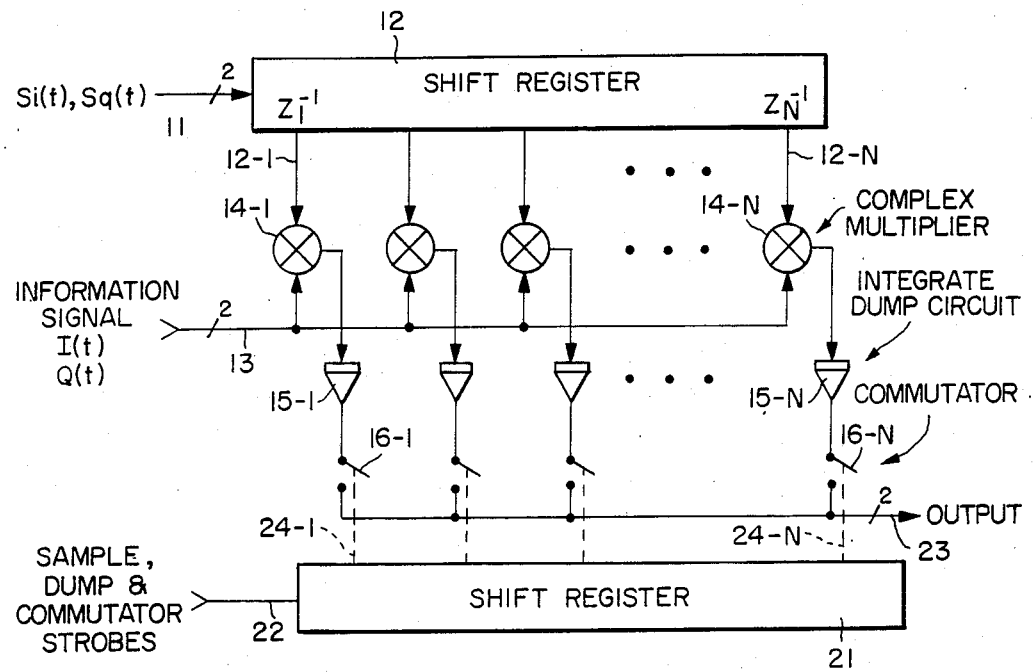
FIG. 1 shows a schematic diagram of a hybrid array correlator.

As described briefly above, the improved correlation scheme according to the present invention overcomes the signal recovery problem caused by the differential encoding characteristic of spread spectrum waveforms, such as those containing CCSK modulation and PPM modulation. The correlator is required to operate with a composite signal consisting of a plurality (two) pseudo-noise generator waveforms which are added together at the source for security purposes. The reasons for employing a pair of pseudo-noise sequences are the requirements for CCSK and PPM data modulation. In each of these modulation techniques, a sequence of pseudo-noise chips, termed a symbol, is employed. The symbol could be on the order of 256 chips in length and has good autocorrelation properties; namely, it enjoys a high correlation peak with low autocorrelation sidelobes. This symbol is employed for all communications over an extended period of time. In other words, the same sequence is employed repeatedly.

PPM or CCSK modulation involves sending a large number of these symbols in sequence to transmit data. Each symbol may represent N bits, wherein N is an integer less than M, where $2^M$ equals the number of chips employed in the symbol. As an example, a single symbol could be 16-ary PPM, where the 256 chips of the symbol are shifted into 16 possible time slots separated by at least two chips. 16-ary PPM can transmit 4-bits per symbol. Similarly, CCSK can be used where the symbol is cyclically shifted through up to 128 positions, each position being separated by two chips from an adjacent chip position, thereby enabling the transmission of seven data bits per symbol.

The use of a pseudo-noise sequence to transmit such symbols is predicated upon the high autocorrelation properties of the PN sequences and, hence, the ease with which time shifts of the symbols can be recognized by a correlator. In order to provide high security, the transmissions are overlaid with another pseudo-random code which does not repeat (a long PN code) over some interval such as a day. Receiving the composite (PN sequence-upon PN sequence) pseudo-noise waveform requires knowledge of both the precise timing of the overlaying PN sequence and the characteristics of both the long PN code and the symbol PN code. Thus, at the receiver, knowledge of the overlaying PN sequence and the symbol PN sequence are an a priori requirement to signal recovery. The present invention, to be described in detail below, makes use of the a priori knowledge and is able to simultaneously strip off the overlying PN code and perform CCSK and PPM pseudo-noise symbol demodulation in the correlation/signal demodulation process.

Before describing this process, a brief description of the hybrid array correlator described in the above referenced copending Frazier application that may be advantageously employed in carrying out the present invention will be set forth. For a more detailed explanation of such a correlator, attention may be had, of course, to that application.

Figure 2:
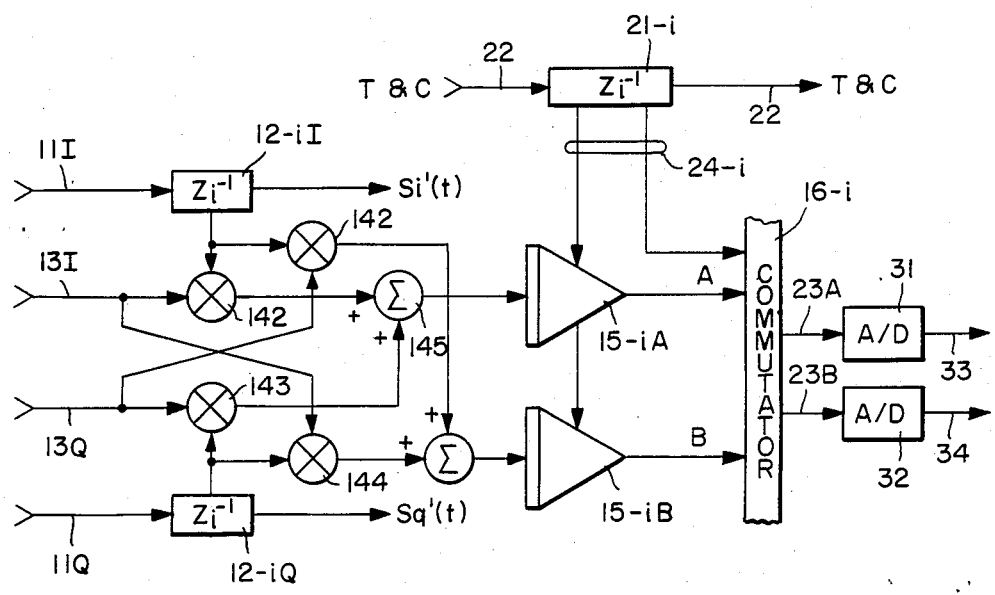
FIG. 2 is a schematic block diagram of the configuration of an individual correlator cell of the array correlator shown in FIG. 1.

Referring now to FIGS. 1 and 2, the correlator itself may be considered to be formed of a grouping of correlator cells, an individual one of which is shown in FIG. 2, employing respective shift registers for delaying the correlation reference sequence and for delaying the timing and control signals for the integrate and dump circuitry. Specifically, a reference signal (for example a spreading function) is coupled over a link 11 to a multistage shift register comprised of an N number of stages $Z^{-1}_1 \ldots Z^{-1}_N$. The outputs of these respective stages are coupled over links 12-1 . . . 12-N to a respective set of complex multipliers 14-1 . . . 14-N. By complex multipliers is meant that the multipliers combine the in-phase and quadrature components of a base-band signal of interest applied over link 13 by the respective delayed versions of the spreading sequence stored in the shift register 12. The outputs of multipliers 14-1 . . . 14-N are coupled to respective integrate and dump circuits 15-1 . . . 15-N, the outputs of which are dumped, or coupled, via commutation switches 16-1 . . . 16-N to output link 23. Control of the operation of commutation switches 16-1 . . . 16-N is effected by a timing or gating strobe sequence that is coupled over link 22 to shift register 21. The respective stages of shift register 21 are coupled over links 24-1 . . . 24-N to control the operation of dump switches 16-1 . . . 16-N.

FIG. 2 shows an individual correlator cell of the hybrid array correlator shown in FIG. 1 for processing the vector components of the base-band information signal on link 13 with the digital reference sequence, to produce the base-band vector components of the achieved correlation. As mentioned previously, both the in-phase I(t) and quadrature Q(t) components of the unknown information signal and the spreading sequence are employed. The in-phase component Si(t) of the reference sequence is coupled over link 11I to stage 12-iI of shift register 12. The quadrature component Sq(t) is coupled over link 11Q to stage 12-iQ of register 12. Similarly, the commutator or strobe signal is coupled over link 22 to shift register stage 21-i of shift register 22. The respective in-phase I(t) and quadrature components Q(t) of the unknown information signal are coupled over links 13I and 13Q and applied to respective multipliers 141/144 and 143/142. Multipliers 141 and 142 receive as second inputs thereof the contents of stage 12-iI of shift register 12, while multipliers 143 and 144 are coupled to stage 12-iQ of shift register 12. The product outputs of multipliers 141 and 143 are summed in adder circuit 145 while the product outputs of multipliers 142 and 144 are subtracted from one another in difference circuit 146. The output of adder 145 is coupled to integrator 15-iA while the output of subtractor 146 is coupled to integrator 15-iB. The outputs of integrators 15-iA/15iB denoted as A/B in FIG. 3 may be respectively defined as $$A = \int_{nT} [(I(t) \cdot Si(t)) + Q(t) \cdot Sq(t))]dt, \text{ and}$$

-continued
$$B = \int nT[(I(t) \cdot Sq(t)) - Q(t) \cdot Si(t))]dt.$$

The integration quantities A and B provided by integrators 15-$i$A and 15-$i$B are coupled to links 23A and 23B under the control of commutator switch 16-$i$ in response to switching signals supplied over link 24-$i$ from stage 21-$i$ of shift register 21. Corresponding digital values are then produced by A/D converters 31 and 32 to be coupled over link 33 and 34 for further signal processing.

The clocking of signals through shift register 21 is such that each shift register stage 21-$i$ provides a one clock cycle delay between adjacent cells or stages (i). The operation of integrators 15-$i$A and 15-$i$B is such that the signals are integrated for the duration of one symbol, at which time the contents thereof are dumped by commutator switch 16-$i$.

Figure 3:
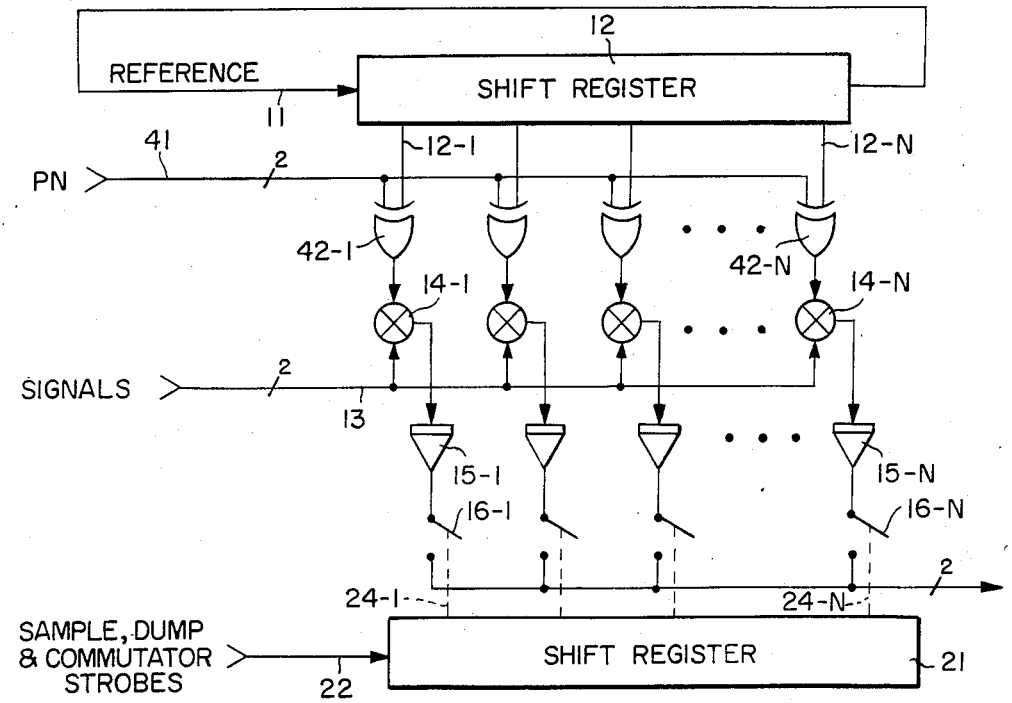
FIG. 3 is a schematic block diagram of a CCSK correlator employing the hybrid array correlator of FIG. 1.

As pointed out above, pursuant to a basic embodiment of the invention, the hybrid array correlator shown in FIGS. 1 and 2 may be coupled to perform simultaneous stripping of the overlying PN code from a CCSK waveform. A hybrid array correlator configured for such a operation is shown in FIG. 3 as further including a set of modulo-2 adders 42-1 ... 42-N coupled between the outputs 12-1 ... 12-N of shift register 12 and the inputs of complex multipliers 14-1 ... 14-N. The overlying PN code is applied over link 41 and common to each of the modulo-2 adders 42-1 ... 42-N. The correlator of FIG. 3 operates as a time invariant matched filter for CCSK modulation by employing as many cells or stages of the correlator as there are bits in the CCSK reference waveform and by looping the last (or $Z^{-1}{}_N$) stage of shift register 12 to the first (or $Z^{-1}{}_1$) stage thereof. In this fashion, the reference sequence continuously circulates through shift register 12.

Figure 4:
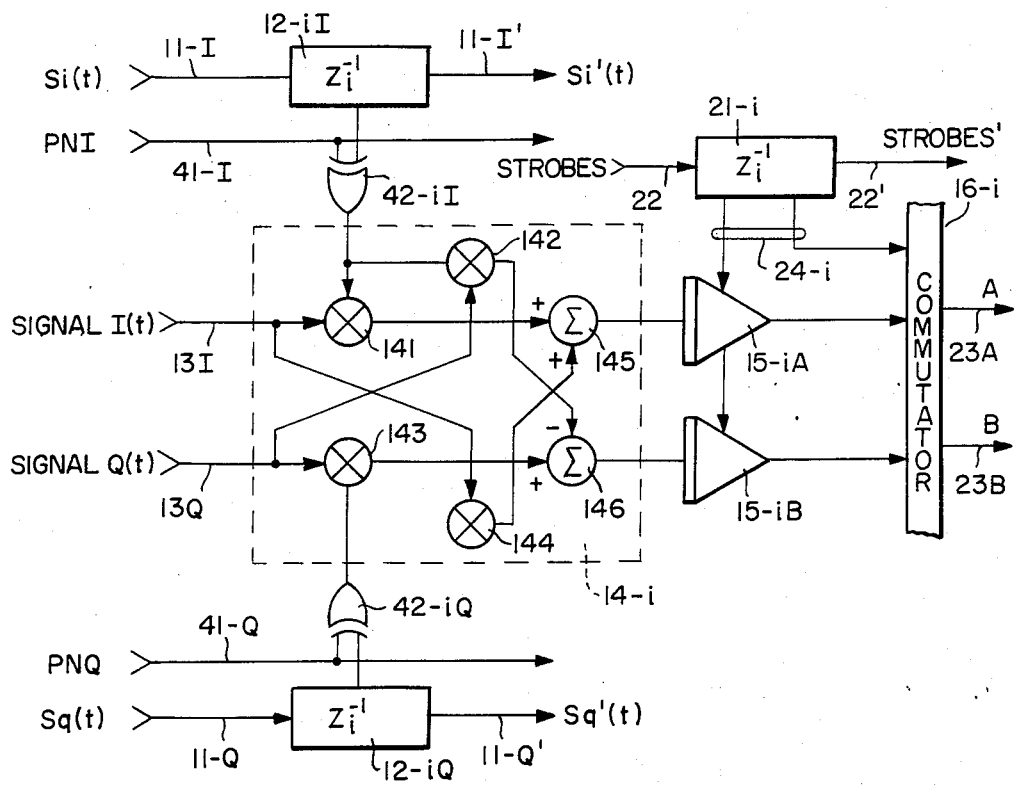
FIG. 4 is a schematic block diagram of the configuration of an individual correlator stage of the CCSK correlator of FIG. 3.

A detailed illustration of an individual cell or stage of the CCSK correlator of FIG. 3 is shown in FIG. 4. As will be appreciated from the foregoing description of an individual cell of the hybrid array correlator of FIG. 2, and the above description of the block diagram illustration of FIG. 3, an individual cell as shown in FIG. 4 differs from that of FIG. 2 in that respective modulo-2 adders 42-$i$I and 42-$i$Q are coupled between the respective in-phase line 41-I for the overlying PN sequence and the quadrature-phase line 41-Q of the overlying PN sequence and the outputs of respective stages 12-$i$I and 12-$i$Q of shift register 12 and the inputs of the complex multipliers. Otherwise, the circuit works identically to the correlator stage shown in FIG. 2.

As pointed out briefly above, for CCSK modulation (or other similar modulation such as PPM), a sequence of pseudo-noise chips which make up a symbol is employed repeatedly. Thus, with the reference sequence being circulated through shift register 12, at any point in time, one of the cells or stages (i) of the correlator will be in time alignment with an incoming CCSK symbol on link 13, since all possible CCSK shifts exist somewhere within the correlator. Thus, the array correlator may be considered to be a time invariant optimal matched filter detector for CCSK signals.

When the CCSK signals are received as MSK modulation, there is approximately 0.9 dB correlation loss due to the quantized nature of the reference signals in the correlator. For example, when the MSK waveform undergoes a transition from 0° to 90° over a single bit period, the correlator correlates with a 45° fixed angle over the entire bit period. This results in the 0.9 dB loss.

In the process of demodulating the incoming spread waveform, it is initially assumed that time synchronization for the commutation strobe sequence coupled over link 22 has been achieved through the use of a customary training sequence that preceeds normal transmission of unknown data, so that the time of arrival of the PN spreading waveform is known. As the details of the implementation or operation of such a training sequence are not necessary for an understanding of the operation of the present invention, they will not be described here. For an exemplary discussion of the use of such a training sequence, attention may be directed to the above referenced copending application.

A component of the demodulation process that is not known is the sequence of N bits of data encoded in the CCSK waveform which results in the one of the $2^N$ possible received sequences, each corresponding to a unique combination of a known PN sequence that has been modulo-2 added to one of the $2^N$ cyclic shifts of the reference waveform. By the provision of the respective modulo-2 adders 42-1 ... 42-N between the respective stages of the recirculating shift register 12 and multipliers 14-1 ... 14-N, for each cell of the array correlator, the reference waveform is modulo-2 added to the undelayed PN signal supplied over link 41 prior to correlating it with the vector components of the signal on link 13. Thus, within each correlator stage or cell, a precise replica of each of the $2^N$ possible received sequences is correlated with the unknown received signal to determine which signal had been sent.

When applying base-band correlation to an MSK waveform, it is necessary to decompose the MSK modulation into its respective in-phase and quadrature components in the same manner as employed in the modulator at the transmitter in creating the waveform. The details of the structure of a cell are shown for such respective in-phase and quadrature components in FIG. 4, as noted above.

In the modulator at the transmitting station, the PN and CCSK reference are modulo-2 added together prior to being differentially encoded. In the demodulator, the reference and PN waveforms may be differentially encoded prior to modulo-2 addition since the modulo-2 addition is transparent to this operation. This permits the array correlator to employ a smaller number of differential encoders than would be required if the encoding was performed after addition at each cell. In the configuration shown in FIGS. 3 and 4 differential encoding is shown as being employed prior to applying the reference and PN waveforms to the correlator stages.

As mentioned previously, timing is achieved through the use of a training sequence so that the strobe signals that are coupled through shift register 21 will properly operate the integrate and dump circuits in order that a useful correlation output be obtained. Once correct timing has been achieved, the reference sequence, separated into its quadrature and in-phase components and differentially encoded, is loaded into the $N=2^N$ stages of shift register 12. Using a 32 stage shift register as an example, for resolving a 32 chip reference sequence into its I and Q components, there will be obtained 16I and 16Q bits.

With the incorporation of modulo-2 adders 42-1 ... 42-N between the recirculating stages of shift register 12 and complex multipliers 14, there will be obtained at the output of the integrators 15 a pair of signals A and B as follows:

$$A = \int_{NT}[(I(t) \cdot Si(t) \cdot PNi(t) + (Q(t) \cdot Sq(t) \cdot PNq(t))]dt,$$

and $$B = \int_{NT}[(I(t) \cdot Sq(t) \cdot PNq(t) - (Q(t) \cdot Si(t) \cdot PNi(t))]dt.$$

As can be seen from these equations, two different spreading functions are applied to create a composite reference in the correlator from which demodulation of the CCSK signals is obtained. Through the configuration shown in FIGS. 3 and 4, the incoming signal is correlated with the time-aligned spreading signal and the time delayed CCSK reference signal at the respective cells. Thus, as pointed out above, one of the correlator cells is time aligned with the CCSK symbol so that operation of the correlator permits demodulation of the symbol.

Figure 5:
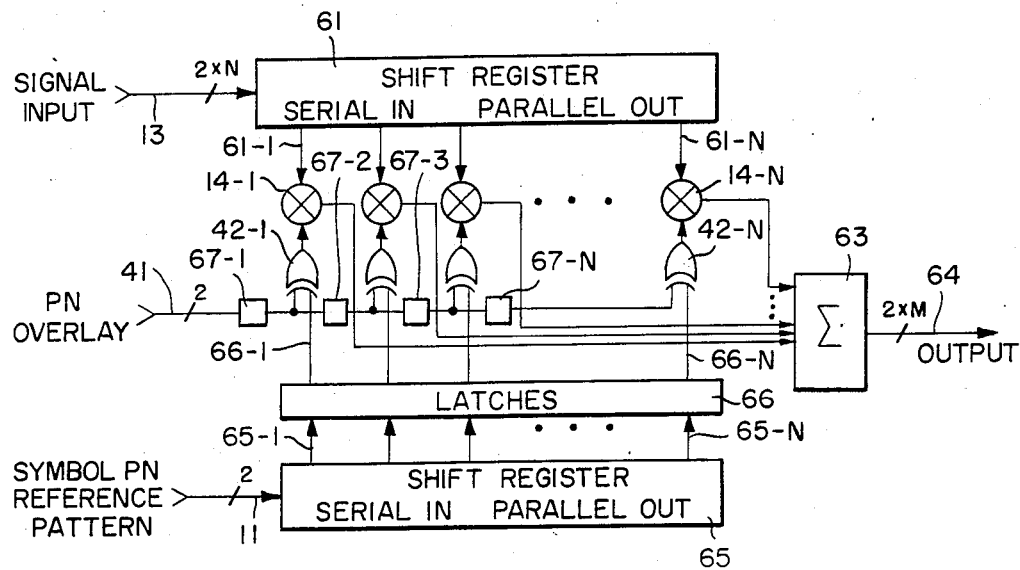
FIG. 5 is a schematic block diagram of a CCSK transversal correlator.

The incorporation of the stripping of the overlying PN code into each correlation process may also be achieved using correlator configurations other than the hybrid array correlator of FIGS. 1–4. FIG. 5 shows the application of the invention to a transversal correlator, whereas FIG. 6 shows the invention employing a digital convolver.

In the correlator of FIG. 5, the signal input is applied to a shift register 61, whereas the reference symbol pattern is coupled over link 11 to a static serial-in-parallel out shift register 65. The overlying PN sequence is coupled over link 41 to a shift register 67 whose individual stages 67-1 . . . 67-N are connected on their outputs to the first inputs respectively of modulo-2 adders 42-1 . . . 42-N. Once the reference sequence has been loaded into shift register 65, it remains in a static condition, being coupled over links 65-1 . . . 65-N to a set of latches or register circuits 66. The contents of these register circuits are coupled over links 66-1 . . . 66-N to second inputs of modulo-2 adders 42-1 . . . 42-N. This transversal correlator thereby takes multiple delayed versions of the signal samples that are coupled through shift register 61 and multiplies each of these versions of the incoming signal by the corresponding reference sample stored in register 66 times the PN overlay in shift register 67. Each of the products of the reference and the unknown signal input is summed in summing circuit 63 to provide an output over link 64.

Figure 6:
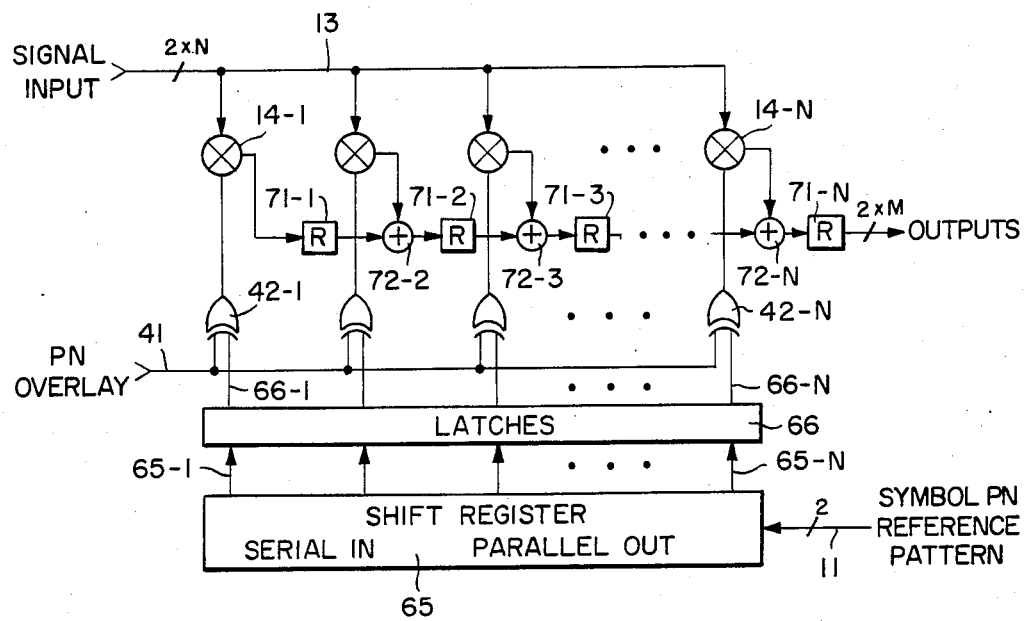
FIG. 6 is a schematic block diagram of a digital convolver configuration of a CCSK correlator.

The digital convolver configuration of FIG. 6 is somewhat similar to the transversal correlator of FIG. 5 in that the symbol sequence is clocked into a register and then loaded into a set of latches to be employed as a static reference. The spreading sequence coupled over link 41 is modulo-2 added with the static reference and then multiplied in respective multipliers 14-1 . . . 14-N with an undelayed version of the signal sequence on link 13. Each complex product, however, is successively stored in a register 71-1 . . . 71-N prior to being summed with the product of the next succeeding stage. This results in a correlation between the modulo-2 products with the symbol sequence stored in the static registers with the undelayed signal samples being sequentially added over all samples of the signal sequence.

In the foregoing description of the various embodiments of the invention, the exemplary modulation technique under consideration is CCSK modulation. As noted earlier, however, it is to be observed that the invention has applicability to similar modulation schemes such as pulse position modulation (PPM), which may be considered to be a modified form of CCSK. PPM with a PN overlay requires a time invariant matched filter the length of which is equal to the symbol span plus each of the PPM time slots summed together. As an example, for a symbol length of 128 chips, and an additional 16-two-chip PPM spacings, the correlator length required will be 160 chips. Still, the basic scheme described above is applicable to such modulation and is capable of simultaneously removing the overlying PN sequence while correlating the unknown signal with the known scrambling sequence towards signal demodulation.

While we have shown and described several embodiments in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:

1. A spread spectrum demodulation apparatus for recovering information signals that have been combined with a prescribed encoding sequence and spread spectrum-modulated onto a carrier for transmission comprising:
   first means for providing a replica of said prescribed encoding sequence;
   second means for providing a replica of the spreading sequence through which the combined information signals have been spread spectrum-modulated onto said carrier;
   third means, coupled to said first and second means, for combining said replica of said prescribed encoding sequence with said replica of said spreading sequence and producing therefrom a plurality of output signals respective ones of which correspond to respective combinations of said spreading sequence and said prescribed encoding sequence mutually shifted in time with respect to one another by successively offset time intervals; and
   fourth means, coupled to said third means, for correlating the respective outputs of said third means with received unknown information signals and deriving therefrom an output representative of the original information signals.

2. An apparatus according to claim 1, wherein said third means comprises means for providing a plurality of replicas of said prescribed encoding sequence each of which is shifted in time with respect to other replicas of said plurality and combining each time shifted replica of said prescribed encoded sequence with said replica of said spreading sequence so as to produce said plurality of output signals.

3. An apparatus according to claim 2, wherein said third means comprises a recirculating shift register through respective stages of which said encoding sequence provided by said first means is successively shifted and a plurality of modulo-two adder circuits, one input of each of which is coupled to a respective stage of said shift register and another input of each of which is coupled to said second means to receive said spreading sequence, the outputs of said plurality of modulo-two adder circuits producing said plurality of output signals.

4. An apparatus according to claim 3, wherein said fourth means comprises a plurality of respective correlator stages, each correlating a first input with a second input and generating an output representative of the correlation between said first and second inputs, said first input corresponding to said received unknown signal and said second input corresponding to the output of a respective modulo-two adder.

5. An apparatus according to claim 4, wherein said fourth means includes an output link from which said output representative of the original information signals is derived, and includes means for selectively coupling the outputs of said respective correlator stages to said output link.

6. An apparatus according to claim 5, wherein said fourth means includes means for sequentially coupling the outputs of said respective correlator stages to said output link in accordance with a prescribed timing sequence.

7. An apparatus according to claim 1, wherein said prescribed encoding sequence comprises a pseudo-noise sequence.

8. An apparatus according to claim 7, wherein said spreading sequence comprises a pseudo-noise sequence.

9. An apparatus according to claim 8, wherein said information signals are modulated as cyclic code shift keying signals.

10. An apparatus according to claim 1, wherein said information signals are modulated as pulse position modulation signals.

11. An apparatus according to claim I, wherein said prescribed encoding sequence comprises a finite length pseudo-random code pattern and said spreading sequence comprises an effectively non-repetitive pseudo-random code sequence.

12. An apparatus according to claim 1, wherein said third means comprises means for providing a plurality of replicas of said spreading sequence each of which is shifted in time with respect to other replics of said plurality and combining each time-shifted replica of said spreading sequence with a respective portion of said prescribed encoding sequence so as to produce said plurality of output signals.

13. An apparatus according to claim 12, wherein said third means further comprises storage means in respective stages of which respective portions of said encoding sequence are stored, and a plurality of modulo-two adder circuits, one input of each of which is coupled to a respective stage of said storage means and another input of each of which is coupled to receive a respective time-shifted replica of said spreading sequence, the outputs of said plurality of modulo-two adder circuits, the outputs of said plurality of modulo-two adder circuits producing said plurality of output signals.

14. An apparatus according to claim 13, wherein said fourth means comprises a shift register through respective stages of which said unknown information signals are sucessively shifted, and a plurality of respective correlator stages, each correlating a first input with a second input and generating an output representative of the correlation between said first and second inputs, said first input being coupled to a respective stage of said shift register and said second input being coupled to the output of a respective one of said modulo-two adder circuits.

15. An apparatus according to claim 14, wherein said prescribed encoding sequence comprises a finite length pseudo-random code pattern and said spreading sequence comprises an effectively non-repetitive pseudo-random code sequence.

16. A spread spectrum demodulation apparatus for recovering information signals that have been combined with a prescribed encoding sequence and spread-modulated onto a carrier for transmission comprising:
first means for providing a replica of said prescribed encoding sequence;
second means for providing a replica of the spreading sequence through which the combined information signals have been spread spectrum-modulated onto said carrier;
third means, coupled to said first and second means, for combining respective portions of said encoding sequence with said replica of said spreading sequence and producing therefrom a plurality of first output signals;
fourth means, coupled to said third means, for combining each of said plurality of first output signals with received unknown information signals and producing therefrom a plurality of second output signals; and
fifth means, coupled to said fourth means, for successively summing said second output signals to derive an output representative of the original information signals.

17. An apparatus according to claim 16, wherein said third means comprises a plurality of modulo-two adder circuits inputs of which are respectively coupled to receive respective portions of said encoding sequence and said spreading sequence, and outputs of which are coupled to supply said first output signals to said fourth means.

18. An apparatus according to claim 17, wherein said fourth means comprises a plurality of multipliers coupled to receive said first output signals and said unknown information signals and to produce said second output signals therefrom.

19. An apparatus according to claim 18, wherein said fifth means comprises a plurality of storage means successivley cascaded to receive and store the sum of the second output signals produced by said multipliers.

20. A spread spectrum signal demodulation apparatus for a recovering information signals that have been combined with a prescribed encoding sequence and spread spectrum-modulated onto a carrier for transmission comprising:
first means for storing a replica of said prescribed encoding sequence;
second means for combining said replica of said prescribed encoding sequence with signals corresponding to the spreading sequence through which the combined information signals have been modulated onto said carrier; and
third means for correlating the output of said second means with received unknown information signals to obtain an output representative of the original information signals, said third means comprising a plurality of respective correlator stages, each stage correlating a first input with a second input and generating a respective output representative of the correlation between said first and second inputs, said first input corresponding to a respective portion of the output of said second means and said second input. corresponding to said received unknown information signals, and including an output link from which said output representative of the original information signals is derived, and including means for selectively coupling the outputs of said respective correlator stages to said output link.

21. An apparatus according to claim 20, wherein said third means includes means for sequentially coupling the outputs of said respective correlator stages to said output link in accordance with a prescribed timing sequence.

22. An apparatus according to claim 21, wherein said prescribed encoding sequence comprises a finite length pseudo-random code pattern and said spreading sequence comprises an effectively non-repetitive pseudo-random code sequence.

23. An apparatus according to claim 22, wherein said second means comprises a plurality of modulo-two adders corresponding to the respective stages of said multiple stage storage means, one of the inputs of each of said modulo-two adders being coupled to a respective stages of said multiple stage storage means and other input of each of said modulo-two adders being coupled to receive said effectively non-repetitive pseudo-random code sequence.

* * * * *